United States Patent [19]
Peitsmeier et al.

[11] Patent Number: 5,690,362
[45] Date of Patent: Nov. 25, 1997

[54] LONGITUDINAL ADJUSTING ARRANGEMENT ON A CASING TUBE TELESCOPE OF A STEERING SPINDLE IN A MOTOR VEHICLE

[75] Inventors: Karl Peitsmeier, Aldingen; Helmut Patzelt, Kernen, both of Germany

[73] Assignee: Mercedes-Benz AG, Stuttgart, Germany

[21] Appl. No.: 665,859

[22] Filed: Jun. 19, 1996

[30] Foreign Application Priority Data

Jul. 3, 1995 [DE] Germany .................. 195 24 196.7

[51] Int. Cl.$^6$ ............................................. B62D 1/19
[52] U.S. Cl. .......................... 280/775; 280/777; 74/493
[58] Field of Search .............................. 280/775, 777; 74/493

[56] References Cited

U.S. PATENT DOCUMENTS

| 4,602,520 | 7/1986 | Nishikawa et al. | 74/493 |
|---|---|---|---|
| 4,691,587 | 9/1987 | Farrand et al. | 74/493 |
| 4,785,684 | 11/1988 | Nishikawa et al. | 74/493 |
| 4,901,593 | 2/1990 | Ishikawa | 74/493 |
| 5,178,411 | 1/1993 | Fevre et al. | 280/775 |
| 5,265,906 | 11/1993 | Faulstroh | 280/775 |
| 5,449,199 | 9/1995 | Heinrichs et al. | 280/775 |

FOREIGN PATENT DOCUMENTS

| 96108303.7 | 10/1996 | European Pat. Off. . |
|---|---|---|
| 2633579 | 1/1990 | France . |
| 3229481C2 | 3/1983 | Germany . |
| 3318935C1 | 12/1984 | Germany . |
| 3536285C1 | 4/1987 | Germany . |
| 1445895 | 8/1976 | United Kingdom . |

OTHER PUBLICATIONS

DE3229481A Derwent Information Ltd., Abstract. Mar. 10, 1983.

*Primary Examiner*—Kenneth R. Rice
*Attorney, Agent, or Firm*—Evenson, McKeown, Edwards & Lenahan, PLLC

[57] ABSTRACT

Longitudinal adjusting arrangement on a casing tube telescope of a steering spindle in a motor vehicle comprises a spindle drive which has a threaded spindle extending in the longitudinal direction outside on the casing tube. The threaded spindle is supported on a first telescope section and, by means of its thread, engages in a spindle nut which is supported on a second telescope section arranged coaxially with respect to the first telescope section. In order to be able to reduce impact energy in this longitudinal adjusting arrangement in the case of a crash, at least one energy absorption element is fixed on at least one of the telescope sections, which energy absorption element, in the case of a movement, particularly an axial movement of the threaded spindle and/or of the spindle nut relative to the respective supporting telescope section, is acted upon by at least one of these parts of the spindle drive.

11 Claims, 1 Drawing Sheet

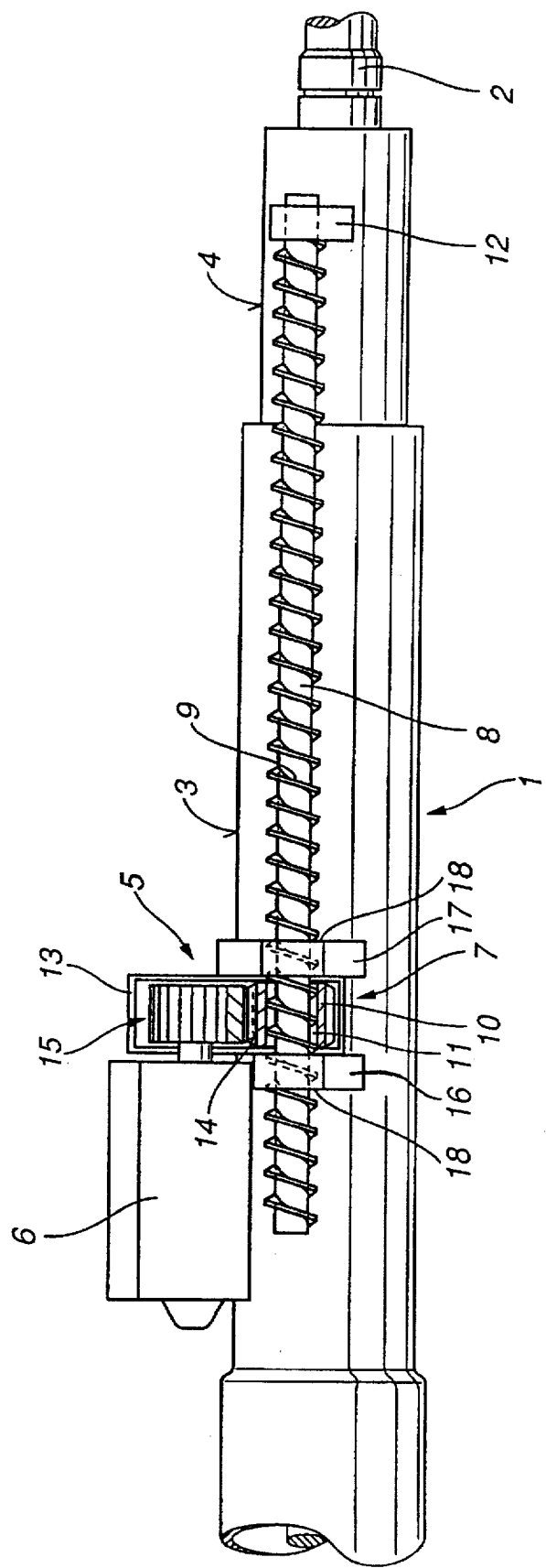

5,690,362

LONGITUDINAL ADJUSTING ARRANGEMENT ON A CASING TUBE TELESCOPE OF A STEERING SPINDLE IN A MOTOR VEHICLE

BACKGROUND AND SUMMARY OF THE INVENTION

This invention relates to a longitudinal adjusting arrangement on a casing tube telescope of a steering spindle in a motor vehicle.

From German Patent Document DE 32 29 481 C2, a longitudinal adjusting arrangement on a casing tube telescope of a steering spindle in a motor vehicle is known, in the case of which a spindle drive operates between the telescope sections of a casing tube. These telescope sections facilitate changes in the length of the casing tube and a steering wheel in the vehicle interior can therefore be adjusted toward the driver or away from the driver. The forces introduced in the longitudinal direction of the casing tube are transmitted from one telescope section to the other by way of the engagement of the spindle thread in a thread of the nut. So that the steering wheel cannot be displaced from its position even in the case of an intense stressing, the form-locking in the thread engagement is constructed to be very stable. However, in principle, in the case of a vehicle crash, as much impact energy as possible, which is introduced from the two ends into the steering column, must also be reduced in it so that a movement of the steering column or of the steering spindle with the steering wheel, which is disadvantageous for the occupants, can be avoided. This arrangement does not provide anything for this purpose.

U.S. Patent Document U.S. Pat. No. 4,785,684 also describes such a construction of a longitudinal adjusting device, which, however, also indicates no possibility of reducing impact energy during a crash in a casing tube telescope according to the above-mentioned type of a spindle drive.

U.S. Patent Document U.S. Pat. No. 4,691,587 shows a steering column whose casing tube can be displaced with respect to the vehicle body by means of a spindle drive. In this case, a high-expenditure bearing of the casing tube by way of the spindle drive on the vehicle body is selected, the possible resiliences for converting energy in the case of a crash being a function of a large number of additional factors in the vehicle body itself which therefore cannot be controlled in a simple manner to ensure that the correct or even no movement of the steering wheel will occur into the vehicle interior. Therefore, in the case of a crash, the deformation of the vehicle body can already cause a displacement of the casing tube which is contrary to the result of a targeted deformation.

Concerning the general background of the longitudinal adjustment on casing tube telescopes, reference is also made to German Patent Documents DE 33 18 935 C1 and DE 35 36 285 C1.

It is an object of the invention to reduce impact energy in the longitudinal adjusting arrangement during a crash in the case of a casing tube telescope with a longitudinal adjusting arrangement of the above-mentioned type.

This object is achieved according to preferred embodiments of the present invention by providing an arrangement wherein at least one energy absorption element is fixed on one of the telescope sections, said energy absorption element being acted upon by at least one of the threaded spindle, and the spindle nut in response to axial movement of the threaded spindle with respect to the spindle nut.

As a result of the energy reduction in the longitudinal adjusting arrangement of the casing tube telescope during a crash, less impact energy is transmitted in the steering column. This counteracts an unfavorable displacement or deformation of the steering column.

The spindle drive, which is responsible for supporting two telescope sections with respect to one another, when it is overtaxed by the introduction of force and is resiliently displaced on a telescope section, will then contribute to the reduction of energy by means of a targeted deformation of the individual energy absorption element or of the energy absorption elements.

An energy absorption element is arranged on the spindle drive at a point where, in the case of a vehicle crash, a movement relative to the supporting telescope section is to be expected first, in which case, by means of predeterminations and tests, several points may also be determined where, as a result of a displacement of the threaded spindle and/or of the spindle nut to the respective telescope section caused in a crash, an energy absorption element can have an energy-converting effect.

For this purpose, the energy absorption element may be formed of a material which, in the case of these stresses, is resilient with a predeterminable resistance. Furthermore, the body shape of the energy absorption element may also be selected for a targeted deformation, as, for example, as a tube which can be deformed in a targeted manner.

A simple introduction of force into an energy absorption element may take place, for example, in that the spindle nut is disposed in energy absorption elements which then, in a crash, are deformed by the high forces introduced into the spindle nut, the introduced impact energy being used for the deformation. For this purpose, it is useful for the spindle nut to be stationarily disposed on the non-displaceable telescope section which is a secure support for the deforming energy absorption element.

Other objects, advantages and novel features of the present invention will become apparent from the following detailed description of the invention when considered in conjunction with the accompanying drawings.

BRIEF DESCRIPTION OF THE DRAWINGS

The single drawing FIGURE is a part sectional schematic view of a section of a casing tube assembly around a steering spindle, constructed according to a preferred embodiment of the present invention.

DETAILED DESCRIPTION OF THE DRAWINGS

A casing tube assembly 15 surrounds a steering spindle 2 to which, on the right in the drawing, a steering wheel in a vehicle interior would be flanged which is not shown here. The casing tube 1 has two telescope sections 3 and 4 by means of which the casing tube length can be changed, in which case the steering spindle 2 or the steering wheel can be displaced along with the displaceable telescope section 4. As a result, the position of the steering wheel can be adapted to the driver's requirements.

The longitudinal adjusting device 5 for this longitudinal change of the casing tube comprises a spindle drive 7 which is electrically driven by way of a motor 6 and which has a threaded spindle 8 with an external thread 9 as well as a spindle nut 10 with an internal thread 11 which meshes with the external thread 9.

The elongated threaded spindle 8 is non-rotatably and stationarily fixed on one end on the displaceable telescope section 4 by means of a fastening 12. In another embodiment, which is not shown, the fastening 12 is constructed as an energy absorption element. The spindle nut 10 is rotatably disposed in a housing 13 and carries an external thread 14 by means of which the spindle nut 10, by way of a reduction gear 15, which is illustrated in a simplified manner, is caused to rotate by the motor 6. In this case, the housing 13 simultaneously also envelopes the reduction gear 15.

By means of the rotation of the spindle nut 10, the spindle nut 10 acts by means of its internal thread 11 in a displacing manner upon the threaded spindle 8, in which case the telescope section 4 is slid into the telescope section 3 or is slid out of it.

The housing 13 itself, which supports the spindle nut 10, is fastened on two energy absorption elements 16 and 17 which extend laterally with respect to the longitudinal direction of the threaded spindle 8 and are fixed on the telescope section 3, which energy absorption elements 16 and 17 each have a passage bore 18 for the threaded spindle 8. In the case of a crash with impact forces introduced into the casing tube 1 from the steering wheel or from the opposite direction from the steering gear, which, as a result of the stressing of the telescope sections 3, 5 act upon the spindle drive 7 in such a manner that the threaded spindle 8 acts upon the spindle nut 10 in a pushing or pulling manner and the spindle nut 10 starts to change its position with respect to the telescope section 3, the housing 13 pushes or pulls on the energy absorption elements 16, 17 which, as a result, are deformed. A single energy absorption element may also be sufficient for the required energy reduction. The energy absorption elements 16, 17, which are shown here only in a simplified manner, are constructed in a targeted fashion with respect to this stress or this deformation which is used for the reduction of impact energy. Thus, for example, a material could be selected for them which, in the case of this stressing, flows with a certain resistance, or whose body shape is provided specifically for the deformation. For example, so-called corrugated tubes or expanded metals, or tube-type pipes which can be turned up, are suitable for this purpose. Furthermore, a shock absorber may also be used as an energy absorption element 16, 17.

Basically, energy absorption elements of this type can be assigned to the spindle nut or to the threaded spindle wherever a resilience of one of these parts is expected in the case of a crash-caused stress. The stationary bearing points of the spindle drive and, in addition, also the non-displaceable telescope section 3 which has a high holding force for supporting the energy absorption elements, are advantageous for the force transmission and the energy conversion.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Longitudinal adjusting arrangement on a casing tube telescope of a steering spindle in a motor vehicle, which has a spindle drive which has a threaded spindle extending in a longitudinal direction outside on the casing tube, which threaded spindle is supported on a first telescope section and, by means of its thread, engages in a spindle nut which is supported on a second telescope section arranged coaxially with respect to the first telescope section, wherein at least one energy absorption element is fixed on one of the telescope sections, said energy absorption element being acted upon by at least one of the threaded spindle and the spindle nut in response to axial movement of the threaded spindle with respect to the spindle nut.

2. Longitudinal adjusting arrangement according to claim 1, wherein the energy absorption element is constructed to absorb pressure forces as well as tensile forces.

3. Longitudinal adjusting arrangement according to claim 1, wherein the energy absorption element has a body shape constructed for a targeted deformation.

4. Longitudinal adjusting arrangement according to claim 1, wherein the energy absorption element is constructed as a shock absorber.

5. Longitudinal adjusting arrangement according to claim 1, wherein the spindle nut is disposed on the at least one energy absorption element.

6. Longitudinal adjusting arrangement according to claim 1, wherein the spindle nut is stationarily disposed on the exterior telescope section fixed to the vehicle body.

7. A vehicle steering assembly comprising:

a steering spindle, a telescope casing having first and second concentric telescopic casing tubes surrounding the steering spindle, a longitudinal adjusting device interposed between the first and second casing tubes at a position on radially outwardly facing surfaces of the casing tubes and at least one energy absorption element fixed on one of the casing tubes at a position to be acted on by at least one movable part of the longitudinal adjusting device.

8. An assembly according to claim 7, wherein said longitudinal adjusting device includes:

a threaded member with an external thread, a nut with an internal thread meshing with the external thread, and a rotating drive unit operably connected to one of the threaded member and nut.

9. An assembly according to claim 8, wherein said threaded member is an elongated member which extends parallel to an axial extent of said casing tubes and which is fixed to the first casing tubes, and wherein the nut is rotatably disposed in a housing and includes external threads or gear teeth operably engaged with an electric motor driven gear.

10. An assembly according to claim 9 wherein said at least one energy absorption element includes a pair of energy elements fastening the housing to the second casing tube.

11. An assembly according to claim 10, wherein the energy absorption elements are configured to absorb both pressure and tensile forces.

* * * * *